United States Patent
Dai

(10) Patent No.: US 8,897,651 B2
(45) Date of Patent: Nov. 25, 2014

(54) PASSIVE OPTICAL NETWORK DATA OVER CABLE SERVICE INTERFACE SPECIFICATION UPSTREAM PROXY ARCHITECTURE OVER THE NEXT GENERATION HYBRID FIBER-COAXIAL NETWORKS

(75) Inventor: Yuxin Dai, Santa Rosa, CA (US)

(73) Assignee: Futurewei Technologies, Inc, Plano, TX (US)

( * ) Notice: Subject to any disclaimer, the term of this patent is extended or adjusted under 35 U.S.C. 154(b) by 552 days.

(21) Appl. No.: 12/855,822

(22) Filed: Aug. 13, 2010

(65) Prior Publication Data

US 2011/0078755 A1    Mar. 31, 2011

Related U.S. Application Data

(60) Provisional application No. 61/246,032, filed on Sep. 25, 2009.

(51) Int. Cl.
*H04B 10/24* (2006.01)
(Continued)

(52) U.S. Cl.
CPC ............. *H04N 7/22* (2013.01); *H04H 20/69* (2013.01); *H04J 14/0252* (2013.01);
(Continued)

(58) Field of Classification Search
CPC .... H04B 10/12; H04B 10/25; H04B 10/2503; H04B 10/2575; H04B 10/25751; H04B 10/2587; H04B 10/272; H04J 3/00; H04J 3/06; H04J 3/0602; H04J 3/0605; H04J 3/0623; H04J 3/0632; H04J 3/0635; H04J 3/0638; H04J 3/0647; H04J 3/0652; H04J 3/0658; H04J 3/0679; H04J 3/0682; H04J 3/0685; H04J 3/0691; H04J 3/0697; H04J 3/1652; H04J 3/1658; H04J 3/1664; H04J 14/0249; H04J 14/0252
See application file for complete search history.

(56) References Cited

U.S. PATENT DOCUMENTS 6,317,234 B1 * 11/2001 Quayle .............................. 398/9
6,742,186 B1 * 5/2004 Roeck ........................... 725/111
(Continued)

FOREIGN PATENT DOCUMENTS

CN    1863011 A    11/2006
CN    101238654 A    8/2008
(Continued)

OTHER PUBLICATIONS

"Part 3: Carrier Sense Multiple Access with Collision Detection (CSMA/CD) Access Method and Physical Layer Specifications," Information Technology—Telecommunications and Information Exchange Between Systems—Local and Metropolitan Area Networks—Specific Requirements, IEEE 802.3ah, copyright 2005.

(Continued)

*Primary Examiner* — Darren E Wolf
(74) *Attorney, Agent, or Firm* — Conley Rose, P.C.; Grant Rodolph; Jonathan K. Polk

(57) ABSTRACT

An apparatus comprising a wavelength division multiplexer (WDM), an optical network unit (ONU) coupled to the WDM, a passive optical network (PON) data over cable service interface specification (DOCSIS) upstream proxy (PDUP) coupled to the ONU and configured to couple to a coaxial cable, and a downstream (DS) optical/electrical (O/E) converter coupled to the WDM and configured to couple to the coaxial cable. An apparatus comprising a WDM, an optical line terminal (OLT) coupled to the WDM, a cable model termination system (CMTS) coupled to the OLT via an upstream external physical (PHY) interface (UEPI), and a DOCSIS and a Quadrature Amplitude Modulation (QAM) unit coupled to the WDM and the CMTS.

15 Claims, 8 Drawing Sheets

(51) Int. Cl.
    *H04B 10/00*     (2013.01)
    *H04H 20/69*     (2008.01)
    *H04J 14/02*     (2006.01)
    *H04N 7/22*     (2006.01)
    *H04Q 11/00*     (2006.01)
    *H04L 12/28*     (2006.01)

(52) U.S. Cl.
    CPC ........ *H04J 14/0247* (2013.01); *H04J 14/0232* (2013.01); *H04Q 11/0067* (2013.01); *H04J 14/0282* (2013.01); *H04L 12/2801* (2013.01); *H04Q 11/0071* (2013.01)
    USPC ............. 398/168; 398/42; 398/140; 398/153; 398/154; 398/165

(56) References Cited

U.S. PATENT DOCUMENTS

| | | | |
|---|---|---|---|
| 7,596,319 | B2 | 9/2009 | Park et al. |
| 2003/0219015 | A1* | 11/2003 | Constant Six et al. ........ 370/389 |
| 2004/0181811 | A1* | 9/2004 | Rakib ........................ 725/122 |
| 2004/0264964 | A1* | 12/2004 | BuAbbud ...................... 398/72 |
| 2005/0172328 | A1* | 8/2005 | Park et al. .................... 725/129 |
| 2006/0056279 | A1* | 3/2006 | Pronk et al. ................. 370/205 |
| 2006/0171711 | A1* | 8/2006 | Ruchet ............................ 398/9 |
| 2008/0152345 | A1 | 6/2008 | Park et al. |
| 2008/0209489 | A1* | 8/2008 | Joyce et al. .................. 725/111 |
| 2008/0232801 | A1* | 9/2008 | Arnold et al. ................. 398/58 |
| 2009/0060530 | A1 | 3/2009 | Biegert et al. |
| 2009/0323715 | A1* | 12/2009 | Levi et al. .................... 370/458 |

FOREIGN PATENT DOCUMENTS

| | | |
|---|---|---|
| CN | 101242674 A | 8/2008 |
| CN | 101478504 A | 7/2009 |
| KR | 20080071667 A | 8/2008 |
| WO | 2008036494 A2 | 3/2008 |

OTHER PUBLICATIONS

"Third-generation transmission systems for interactive cable television services—IP cable modems: Overview," Series J: Cable Networks and Transmission of Television, Sound Programme and Other Multimedia Signals—Interactive systems for digital television distribution, ITU-T Recommendation J.222.0, Dec. 2007.

"Third-generation transmission systems for interactive cable television services—IP cable modems: Physical layer specifiation," Series J: Cable Networks and Transmission of Television, Sound Programme and Other Multimedia Signals—Interactive systems for digital television distribution, ITU-T Recommendation J.222.1, Jul. 2007.

"Third-generation transmission systems for interactive cable television services—IP cable modems: MAC and Upper Layer protocols vol. 1: Core Recommendation," Series J: Cable Networks and Transmission of Television, Sound Programme and Other Multimedia Signals—Interactive systems for digital television distribution, ITU-T Recommendation J.222.2, Jul. 2007.

"Third-generation transmission systems for interactive cable television services—IP cable modems: MAC and Upper Layer protocols vol. 2: Annexes and appendices," Series J: Cable Networks and Transmission of Television, Sound Programme and Other Multimedia Signals—Interactive systems for digital television distribution, ITU-T Recommendation J.222.2, Jul. 2007.

Foreign Communication From a Related Counterpart Application, International Application No. PCT/CN2010/076571, International Search Report dated Dec. 10, 2010, 4 pages.

Foreign Communication From a Related Counterpart Application, International Application No. PCT/CN2010/076571, Written Opinion dated Dec. 10, 2010, 7 pages.

"Media Access Control Protocol Operation", Data-Over-Cable Service Interface Specifications, Radio Frequency Interface Specification SP-RFIv2.0-I01-011231,Section 9, Cable Television Laboratories, Inc., Copyright 2001, 480 pages.

\* cited by examiner

US 8,897,651 B2

PASSIVE OPTICAL NETWORK DATA OVER CABLE SERVICE INTERFACE SPECIFICATION UPSTREAM PROXY ARCHITECTURE OVER THE NEXT GENERATION HYBRID FIBER-COAXIAL NETWORKS

CROSS-REFERENCE TO RELATED APPLICATIONS

The present application claims priority to U.S. Provisional Patent Application 61/246,032, filed Sep. 25, 2009 by Yuxin Dai, and entitled "PON DOCSIS Upstream Architecture over the Next Generation HFC Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hybrid fiber-coaxial (HFC) is a broadband network that is employed by cable Television (TV) operators and that combines optical fiber and coaxial cable technologies. The HFC comprises point-to-point (P2P) fiber that extends from an operators' site, e.g. a headend or central office, to an optical node (ON), which serves a plurality of customers or customer premise equipment (CPE) via a coaxial plant that comprises branching coaxial cables. The headend comprises telephony equipment for providing telecommunications services, satellite dishes to receive distant video signals, and/or Internet Protocol (IP) aggregation routers. The services are encoded, modulated, up-converted onto Radio Frequency (RF) carriers, and/or combined onto an electrical signal and then forwarded using an optical transmitter from the headend to the ON. The optical transmitter converts the electrical signal to an optically modulated signal before sending the signal downstream to the ON via a fiber optic cable, e.g. in a P2P topology. The ON comprises an optical receiver, which converts the received optical signal from the headend to an electrical signal, which is then forwarded to the customers via the coaxial plant or coaxial cables. The ON also comprises a reverse/return path transmitter that sends communications from the customers to the headend. The reverse/return transmitter converts electrical signals from the customers into an optical signal, which is then forwarded upstream to the headend.

SUMMARY

In one embodiment, the disclosure includes an apparatus comprising a wavelength division multiplexer (WDM), an optical network unit (ONU) coupled to the WDM, a passive optical network (PON) data over cable service interface specification (DOCSIS) upstream proxy (PDUP) coupled to the ONU and configured to couple to a coaxial cable, and a downstream (DS) optical/electrical (O/E) converter coupled to the WDM and configured to couple to the coaxial cable.

In another embodiment, the disclosure includes an apparatus comprising a WDM, an optical line terminal (OLT) coupled to the WDM, a cable model termination system (CMTS) coupled to the OLT via an upstream external physical (PHY) interface (UEPI), and a DOCSIS and a Quadrature Amplitude Modulation (QAM) unit coupled to the WDM and the CMTS.

In yet another embodiment, the disclosure includes an apparatus comprising at least one processor coupled to a memory and configured to receive an electrical burst signal from a plurality of customer equipment via a coaxial plant, wherein the electrical burst signal comprises a preamble and a plurality of DOCSIS media access control (MAC) frames, and wherein each of the DOCSIS MAC frames comprise a packet data unit (PDU), encapsulate the upstream burst in a payload portion of an Ethernet frame, and transmit the Ethernet frame upstream to an OLT on an optical carrier channel.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A PON system may use QAM RF overlay to deliver broadcast video, which is often referred to as hybrid Internet Protocol (IP) television (IPTV). For example, Verizon's FIOS system uses a Hybrid IPTV architecture to deliver triple play services to customers, which may comprise bundled home communications services, such as television services, Internet, and/or telephone. The QAM video services may be delivered via a PON optical distribution network (ODN), e.g. using downstream optical signals at about 1550 nanometer (nm) wavelength. Additionally, the PON may deliver Internet data, Voice over IP (VoIP), and/or Video on Demand (VOD) services using a time division multiplexing (TDM) scheme. However, the hybrid IPTV architecture may be based on a PON topology, where each PON supports a limited quantity of users and that may be difficult to extend to more users. For example, each PON may not serve more than about 32 video end-users. As such, additional PONs may be needed to provide video services to more customers, which may increase cost for deployment and operational support.

Figure 1:
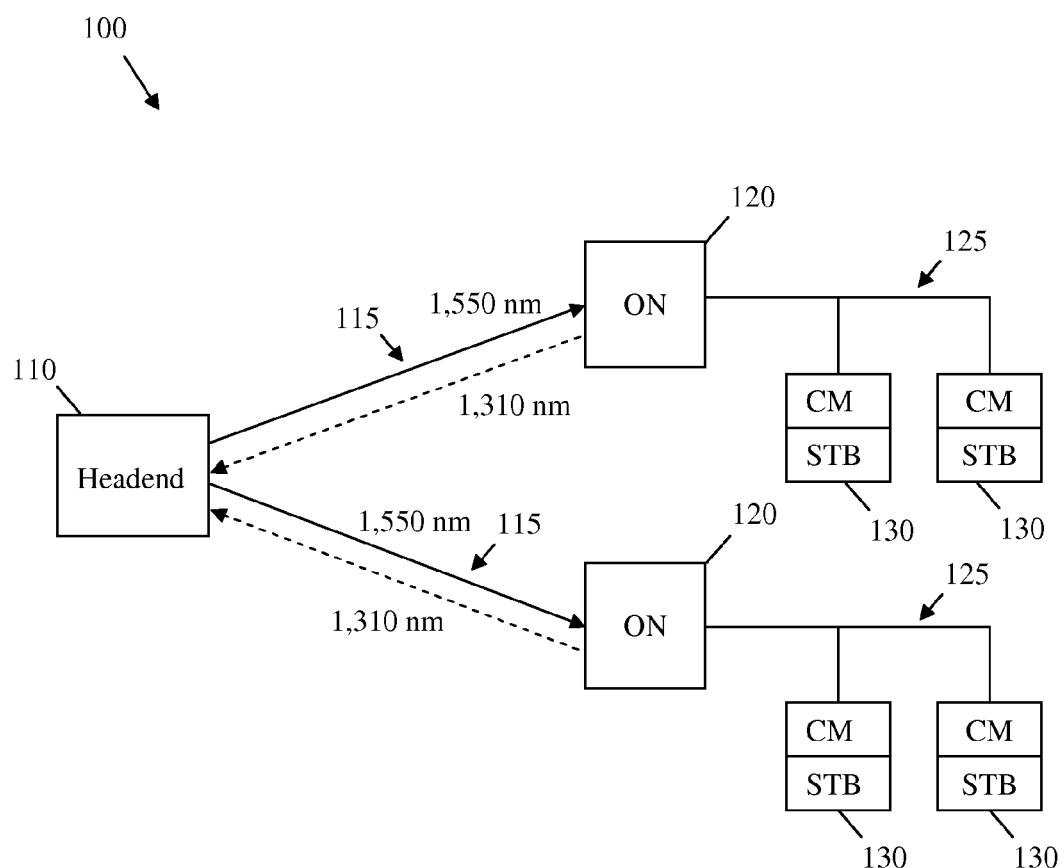
FIG. 1 is a schematic diagram of an embodiment of a standard HFC.

FIG. 1 shows a traditional or standard HFC 100 that may be typically used to provide QAM video services and Internet, VoIP, and/or VOD services to a plurality of customers, e.g. at residential locations. The HFC 100 may comprise a headend 110 and a plurality of ONs 120 that may be coupled to the headend 110 via a plurality of corresponding optical fiber cables 115 in a P2P topology. Each ON 120 may also be coupled to a plurality of customer equipment 130, such as cable modems (CMs) and/or set-up boxes (STBs) via a plurality of corresponding coaxial plants 125, e.g. at the residential locations.

The headend 110 may be configured to modulate a video service in electrical signal format using QAM, e.g. at a RF carrier, convert the electric signal to an optical signal format and broadcast the optical signal downstream to the ONs 120 via the corresponding optical fiber cables 115. Additionally, the headend 110 may transmit Internet and/or other IP services (e.g. data, video, and/or VoIP) to the ONs 120 via the optical fiber cables 115 using DOCSIS protocols. The QAM video service, Internet service, and/or other IP services may be transmitted from the headend 110 to the ONs 120 over a downstream wavelength channel, e.g. at about 1,550 nm (represented by the solid lines between the headend 110 and the ONs 120).

The ONs 120 may be configured to receive the optical signals, converge them into corresponding electrical signals, and transmit the electrical signals into coaxial cable plants. Additionally, the ONs 120 may be configured to transmit upstream optical signals, which may comprise Internet, data, and/or other communications to the headend 110 via the corresponding optical fiber cables 115 on an upstream wavelength channel, e.g. at about 1,310 nm (represented by the dashed lines between the headend 110 and the ONs 120).

The customer equipment, such as CMs and/or STBs, may be configured to receive the IP services, video services, and/or system control data, from the corresponding ON 120 via the coaxial plant 125 in electrical signal format. The CMs/STBs may demodulate or process the received electrical signal to provide the services to the customers or end-users that are associated with the customer equipment 130. The CMs/STBs may also modulate and send data in the format of electrical signals from the customer equipment 130 to the ON 120 via the coaxial plant 125. The data may correspond to uploaded Internet data, user requests, user settings, and/or system control data.

Disclosed herein is a system and apparatus for improving the QAM RF video PON overlay (hybrid IPTV) architecture, e.g. to provide video and data services to more end-users, reduce system cost, or both. The system may use a PDUP architecture that may use a TDM PON scheme and may be based on a star or point-to-multipoint (P2MP) PON ODN topology. The PDUP architecture may combine the DOCSIS protocol and the TDM PON scheme to extend the coaxial plants to serve a greater number of end-users. As such, the DOCSIS protocol may be used for scheduling upstream transmissions from a plurality of CMs to the headend via TDM PON.

The P2MP ODN in the PDUP architecture may deliver video services (e.g. QAM video services) to more end-users than standard Hybrid IPTV architectures that do not support coaxial plant extensions. The PDUP architecture may also provide more scalable RF return than standard HFC architectures and reduce the network deployment and operational cost, e.g. by supporting more end-users and/or services using a unified access network, e.g. PON, for multiple system operators (MSOs). Additionally, the system may use the DOCSIS protocol and substantially the full bandwidth, e.g. about five Gigabits per second (Gbps), of the coaxial plant from the ON to provide a combine platform for residential and business services for MSOs.

Figure 2:
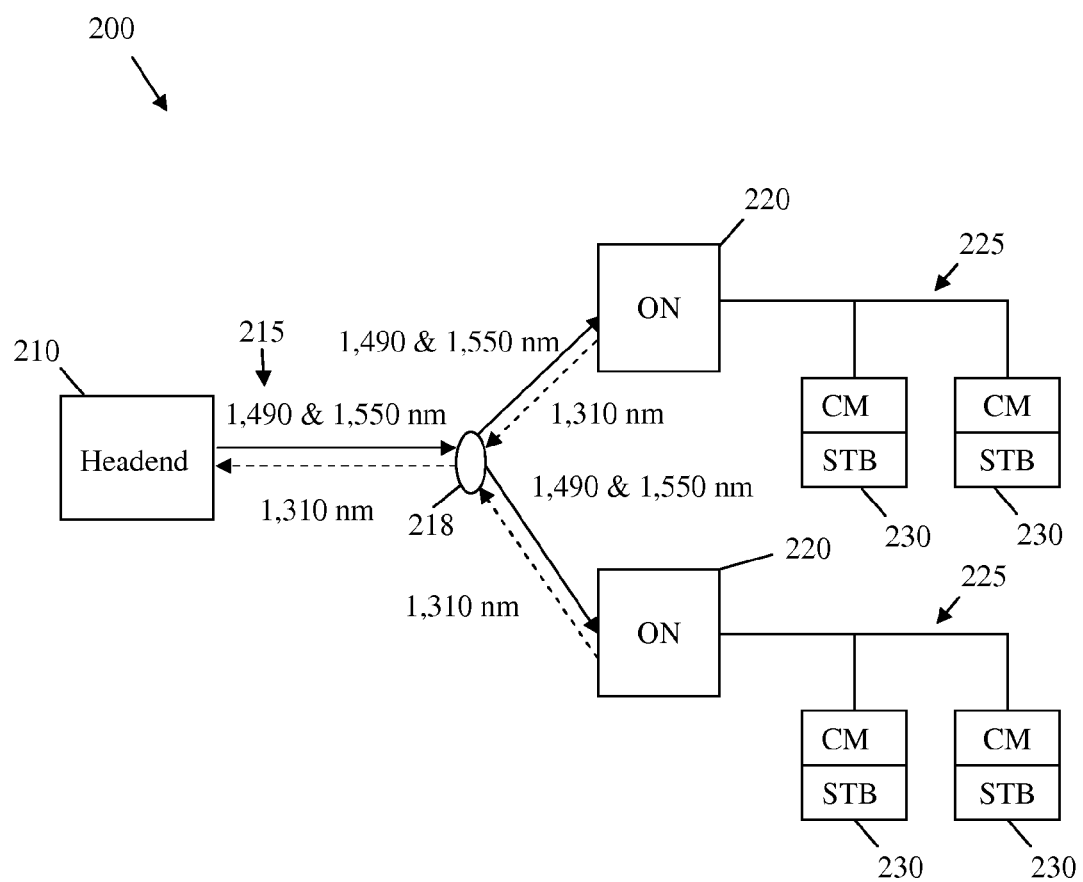
FIG. 2 is a schematic diagram of an embodiment of a modified HFC.

FIG. 2 shows an embodiment of a next generation (NG) or improved HFC 200 that may be used to provide QAM video services and Internet, VoIP, and/or VOD services to a greater number of customers than the HFC 100, e.g. at a lower deployment and operation cost. The HFC 200 may comprise a headend 210 and a plurality of ONs 220 that may be coupled to the headend 210 via a plurality of optical fiber cables 215 in a P2MP topology. Additionally, the HFC 200 may comprise a plurality of customer equipment 230 coupled to the ONs 220 via a plurality of corresponding coaxial plants 225. The components of the HFC 200 may be configured to operate similar to the corresponding components of the HFC 100, e.g. to send the video service, Internet service, and/or other services to the ONs 220 and the customer equipment 230 and transmit upstream communications from the customer equipment 230 and the ONs 220. However, at least some of the components of the HFC 200 may be modified, as described in detail below, to support the extension of the QAM video services to a greater quantity of customer equipment in comparison to the standard HFC 100 at a lower system cost. The HFC 200 may also provide better use of the system's RF bandwidth capacity and combined residential and business services on a single platform, e.g. for MSOs.

Based on the P2MP topology, the headend 210 may be coupled to the ONs 220 via a PON, which may comprise an OLT in the headend 210, a plurality of ONUs in the ONs 220, and an ODN between the headend 210 and the ONs 220. The PON may be configured to implement a time division multiple access (TDMA) scheme for upstream communications, and as such the PON may be a Gigabit PON (GPON) as defined by the International Telecommunication Union (ITU) Telecommunication Standardization Sector (ITU-T) G.984 standard or an Ethernet PON (EPON) as defined by the Institute of Electrical and Electronics Engineers (IEEE) 802.3ah standard. Alternatively, the PON may be a Next Generation Access (NGA) system, such as a 10 Gbps GPON (XGPON), a 10 Gigabit EPON as defined by the IEEE 802.3av standard, an asynchronous transfer mode PON (APON), or a broadband PON (BPON) as defined by the ITU-T G.983 standard, all of which are incorporated herein by reference as if reproduced in their entirety.

The ODN may comprise the optical fiber cables 215 and any combination of couplers, splitters, distributors, and/or other equipment. The optical fiber cables 215, couplers, splitters, distributors, and/or other equipment may be passive optical components, e.g. which do not require any power to operate. Alternatively, the ODN may comprise one or a plurality of active components, such as optical amplifiers.

The ODN may extend from the headend 210 to the ONs 220 in a star topology or branching configuration, e.g. using at least one splitter 218, as shown in FIG. 2. For instance, the splitter 218 may couple about 32 ONs 220 to the headend 210. Such P2MP topology may allow extending the quantity of ONs 220 and therefore the quantity of served customer equipment at a lower system cost that in the case of the P2P topology of the HFC 100. However, in the modified HFC 200 the headend 210 may also be configured to transmit data, Internet and/or other services over a second downstream wavelength channel, e.g. at about 1,490 nm. In FIG. 2, the downstream channels are represented by solid lines and the upstream channels are represented by dashed lines between the headend 210 and the ONs 220. The data in the second downstream wavelength channel may be sent in the ODN to the ONUs in the ONs 220, which may act as distribution sites for the services, e.g. for the customer equipment 230, business customers, and/or other customers. Thus, the HFC 200 may provide a single or common platform to provide residential services (e.g. by the customer equipment 230) and business services (e.g. by the ONUs at the ONs 220). Allocating the video service to a first downstream wavelength channel (e.g. at about 1,550 nm) and other data, Internet, and/or IP services to the second downstream wavelength channel (e.g. at about 1,490 nm) may provide greater bandwidth capacity for transporting the video service in the PON and with coaxial cable extensions may provide great numbers of more end-users than normal TDM PON and thus allow for better usage of the system's RF bandwidth capacity, e.g. at about five Gbps. Consequently, video service may be extended to more ONs 220 and more customer equipment 230 attached to the coaxial cable extension, e.g. about ten times more than the quantity of video end-users that can be supported using current TDM PON technologies. This may also result in providing more scalable RF return than standard HFC architectures in FIG. 1.

The first downstream wavelength channel (e.g. at about 1,550 nm), the second downstream wavelength channel (e.g. at about 1,490 nm), and the upstream wavelength channel (e.g. at about 1,310 nm) for each ON 220 and their corresponding customer equipment 230 may be transported via the same optical fiber cable 215 (e.g. a trunk fiber) between the headend 210 and the splitter 218, and therefore a mechanism may be needed to separate the different channels that correspond to the different ONs 220. As such, the components of the HFC 200 may be configured based on a PDUP to process the upstream wavelength channels that correspond to different ONs 200 and their corresponding customer equipment 230 using the TDM scheme and the DOCSIS protocol, as described below.

Figure 3:
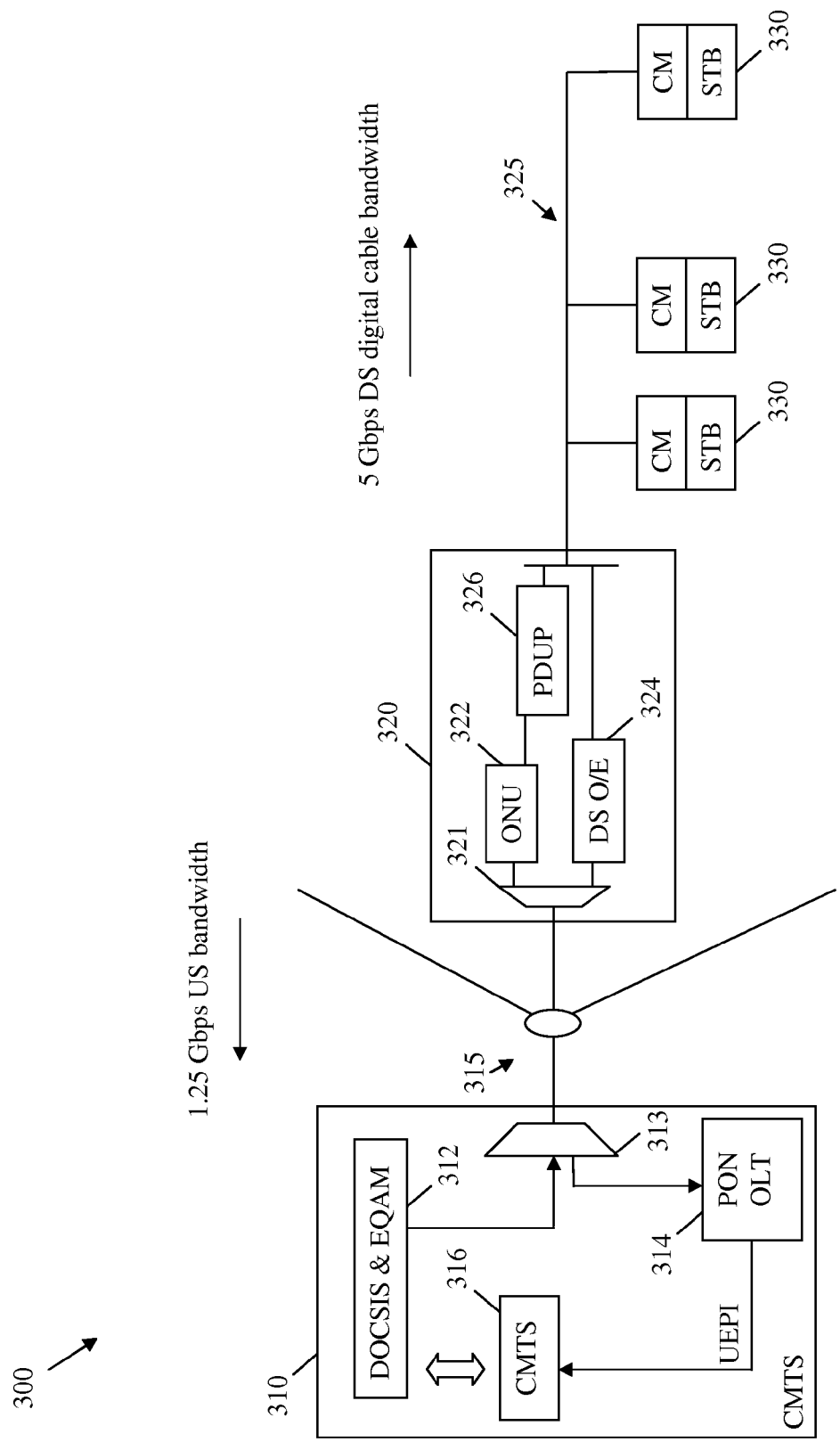
FIG. 3 is a schematic diagram of an embodiment of a PON DOCSIS upstream proxy architecture.

FIG. 3 shows an embodiment of a PDUP architecture 300, which may be used for a NG HFC, such as the NG HFC 200. Accordingly, the NG HFC may comprise a headend 310 that may be coupled to a plurality of ONs 320 via a plurality of optical fiber cables 315 in a P2MP topology, e.g. using a star or branching ODN configuration as described above. Although one ON 320 is shown in FIG. 3, the NG HFC may comprise any quantity of ONs 320. The ONs 320 may also be coupled to a plurality of customer equipment 330 via a plurality of corresponding coaxial plants 325. The components in the PDUP architecture 300 may be configured substantially similar to the components of the HFC 200. Specifically, the headend 310 may comprise a DOCSIS and edge QAM (EQAM) unit 312, a first splitter 313 (e.g. a WDM) coupled to the DOCSIS and QAM unit 312, an OLT 314 coupled to the first splitter 313, and a CMTS 316 coupled to the OLT 314 and the DOCSIS and EQAM unit 312. The ON 320 may comprise a second splitter 321 (e.g. a WDM), an ONU 322 coupled to the second splitter 321, a DS O/E converter 324 also coupled to the second splitter 321, and a PDUP 326 coupled to the ONU 322 and the DS O/E converter 324.

The DOCSIS and EQAM unit 312 may be configured to modulate the video and data services using QAM and up-convert the video and data services on a RF carrier in electrical signal format. The DOCSIS and EQAM unit 312 may also comprise or may be coupled to an O/E signal converter (not shown) that may convert the electrical signal to an optical signal. Thus, the QAM video service may be transported from the DOCSIS and EQAM unit 312 to the multiplexer/demultiplexer 313 on an optical carrier, e.g. at about 1,550 nm, which may be broadcast to the ONs 320. Additionally, the DOCSIS and EQAM unit 312 may use the DOCSIS protocol to support relatively high speed data transfer over the HFC infrastructure, e.g. to provide Internet access (e.g. cable internet) over a cable TV (CATV) system. The DOCSIS protocol may substantially increase transmissions speeds, e.g. for upstream and/or downstream channels, and may support IP transport, such as IP version 6 (IPv6).

The OLT 314 may be part of the PON in the system and may be any device configured to communicate with the ONs 320 and optionally another network (not shown). The OLT 314 may act as an intermediary between the other network and the ONs 320. For instance, the OLT 314 may forward data received from the network to the ONs 320, and forward data received from the ONs 320 onto the other network. Although the specific configuration of the OLT 314 may vary depending on the type of PON, in an embodiment, the OLT 314 may comprise a transmitter and a receiver. When the other network is using a network protocol that is different from the PON protocol used in the PON, the OLT 314 may comprise a converter that converts the network protocol into the PON protocol. The OLT converter may also convert the PON protocol into the network protocol.

The first splitter 313 may be configured to separate and redirect the first downstream wavelength channels (e.g. at about 1,550 nm) from the DOCSIS and EQAM unit 312 towards the ONs 320 and the upstream wavelength channels (e.g. at about 1,310 nm) from the ONs 320 to the OLT 314. Additionally, the first splitter 313 may redirect the second wavelength channel (e.g. at about 1,490 nm) from the OLT 314 to the ONs 320. In an embodiment, the first splitter 313 may comprise a wavelength division multiplexer/demultiplexer that may be configured to separate and redirect the different wavelength channels to their corresponding components.

The CMTS 316 may be configured to receive and process the upstream data, Internet, and/or other services from the OLT 314. Such data and/or services may be transmitted from the CMs in the customer equipment 330 and may be received and converted by the OLT 314 from optical signal format to electrical signal format. The OLT 314 may then forward the data and/or services to the CMTS 316 via an UEPI. The CMTS 316 may implement a DOCSIS protocol stack to process the received data and/or services, as described in more detail below, and then send the processed information to higher network layers.

The second splitter 321 may be configured to separate and redirect the first downstream wavelength channels from the headend 310 to the DS O/E converter 324 and the upstream wavelength channels from the customer equipment 330 and the ONU 322 to the headend 310. Additionally, the second splitter 321 may redirect the second wavelength channel from the headend 310 to the ONU 322. Similar to the first splitter 313, the second splitter 321 may comprise a wavelength division multiplexer/demultiplexer that may be configured to separate and redirect the different wavelength channels to their corresponding components.

The ONU 322 may be any device that is configured to communicate with the OLT 314 and the customer equipment and/or another customers or users (not shown). Specifically, the ONU 322 may act as an intermediary between the OLT 314 and the customer. For instance, the ONU 322 may forward data received from the OLT 314 to the customer, and forward data received from the customer onto the OLT 314. Although the specific configuration of the ONU 322 may vary depending on the type of PON, in an embodiment, the ONU 322 may comprise an optical transmitter configured to send optical signals to the OLT 314 and an optical receiver configured to receive optical signals from the OLT 314. Additionally, the ONU 322 may provide native TDM PON services for other customers, such as business customers, that are not associated with the customer equipment 330.

Further, the ONU 322 may be configured to receive electrical signals from the CMs in the customer equipment 330 via the PDUP 326 and convert the signal into an optical signal, which may be sent in the upstream wavelength channel to the headend 310. The electric signals from the CMs may comprise data and/or services that are intended for the CMTS 316. Since a plurality of ONUs 322 in a plurality of ONs 320 may send different data and/or services for different customer equipment on the same upstream wavelength channel, e.g. according to the P2MP topology, the PDUP 326 in each ON 320 may be configured to implement to use TDM PON for upstream scheduling on ODN, as described below. As such, the ONs 320 may act as PDUPs in the HFC that properly schedule upstream transmissions to the headend 310. The ON 320 and the ONU 322 may be typically located at distributed locations, such as customer and/or business premises, but may be located at other locations as well.

The DS O/E converter 324 may be configured to convert the optical signal in the first downstream wavelength channel into electrical signals that may be forwarded to the customer equipment 330. The electrical signal may carry the QAM video service and/or other data services, such as DOCSIS system control and triple play services. For instance, the QAM video service and other Internet or IP services may be received, via the coaxial plant 325, by the STBs and the CMs in the customer equipment 330, respectively. The different data and/or services in the first downstream wavelength channel that may be intended for different ONs 320 and/or different customer equipment 330 may be properly scheduled, e.g. by the components of the headend 310, using the DOCSIS scheme.

Figure 4:
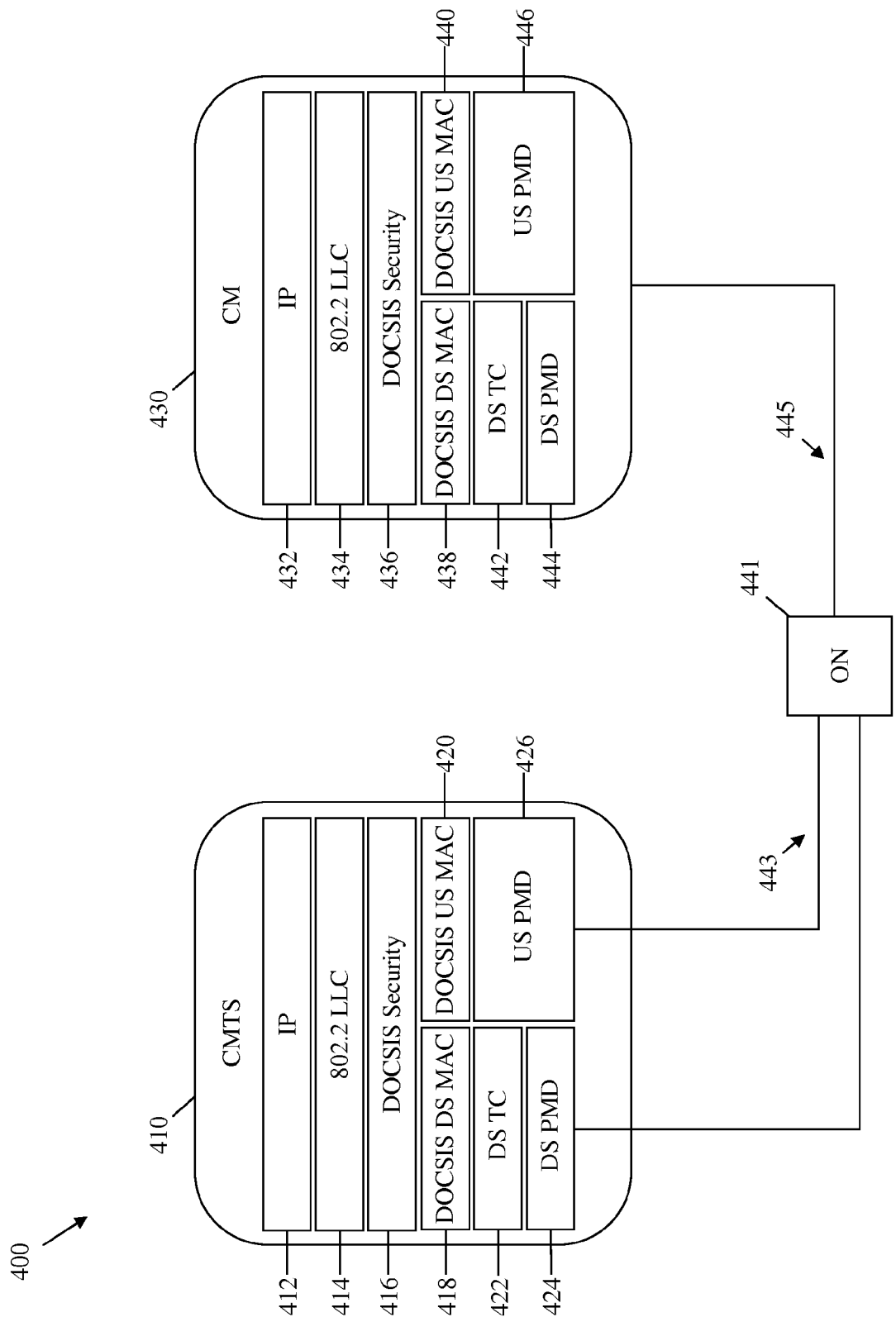
FIG. 4 is a schematic diagram of an embodiment of a standard DOCSIS protocol stack.

FIG. 4 illustrates an embodiment of a standard or traditional DOCSIS protocol stack 400, which may be implemented to process the downstream and/or upstream transmitted data and/or services in a traditional or standard HFC, such as the HFC 100. The DOCSIS protocol stack 400 may comprise a first stack 410 that may be implemented in a CMTS at the headend, e.g. the headend 110, and a second stack 430 that may be implemented in a CM at a customer equipment, e.g. the customer equipment 130. At the bottom of the first stack 410 and the second stack 430, communications may be established via an ON 441 in the HFC, such as the ON 120. ON 441 performs optical signals to electrical signals conversion. Specifically, the ON 441 may converge optical downstream and/or upstream signals between the CMTS and the CM.

The first stack 410 may comprise a first IP layer 412 at the top for which corresponding frames may be encapsulated by a first IEEE 802.2 Logical Link Control (LLC) layer 414, and subsequently by a first DOCSIS Security layer 416. For downstream transmissions, the frames corresponding to the first DOCSIS security layer 416 may be encapsulated by a first DOCSIS DS MAC layer 418, followed by a first DS Transmission Container (TC) layer 422, and transmitted over the optical fiber cable 443 according to a first DS Physical Medium Dependent (PMD) layer 424. For upstream transmissions, the frames corresponding to the first DOCSIS security layer 416 may be encapsulated by a first DOCSIS upstream (US) MAC layer 420, and received over the optical fiber cable 443 according to a first US PMD layer 426. The layers may be implemented from a higher logical level at the top of the stack (e.g. the first IP layer 412) to a lower physical level at the bottom of the stack (e.g. the first DS PMD layer 424) for transmitted downstream traffic, similar to that used for the International Organization for Standardization (ISO) protocol stack. Thus, the first stack 410 may be implemented to send data and/or services from a logical frame or packet format (e.g. IP packets) into a physical optical signal that may be forwarded to the ON 441. Similarly, the upstream optical signal that is received from the ON 441 may be processed from a lower physical level at the bottom of the stack (e.g. the first US PMD 426) to a higher logical level of the stack. Thus, the first stack 410 may be implemented to convert the received data and/or services from a physical optical signal into a logical frame or packet format.

Similarly, the second stack 430 may comprise a second IP layer 432 at the top for which corresponding frames may be encapsulated by a second IEEE 802.2 LLC layer 434 and subsequently by a second DOCSIS Security layer 436. For downstream transmissions, the frames corresponding to the second DOCSIS Security layer 436 may be encapsulated by a second DOCSIS DS MAC layer 438, followed by a second DS TC layer 442, and transmitted over the coaxial cable 445 according to a second DS PMD layer 444. For upstream transmissions, the frames corresponding to the second DOCSIS Security layer 436 may be encapsulated by a second DOCSIS US MAC layer 440, and received over the coaxial cable 445 according to a second US PMD layer 446. The second layers may implemented from the top of the stack to the bottom of the stack for transmitted upstream traffic and from the bottom of the stack to the top of the stack for received downstream traffic, similar to that used for the first stack 410.

As is typical in the case of upstream transmissions, an upstream electrical signal in QAM and/or quaternary phase-shift keying (QPSK) format may be transmitted from the CM via the coaxial plant to the ON 441. The upstream electrical signal may be converted into a corresponding optical signal at the ON 441 and then transmitted via an optical fiber cable 442 to the CMTS, where the DOCSIS US MAC layer 420 information may be processed. In this case, the DOCSIS protocol may be implemented and the signals/frames may be processed accordingly in the CMTS and/or the CM in a manner transparent to the ON 441.

Figure 5:
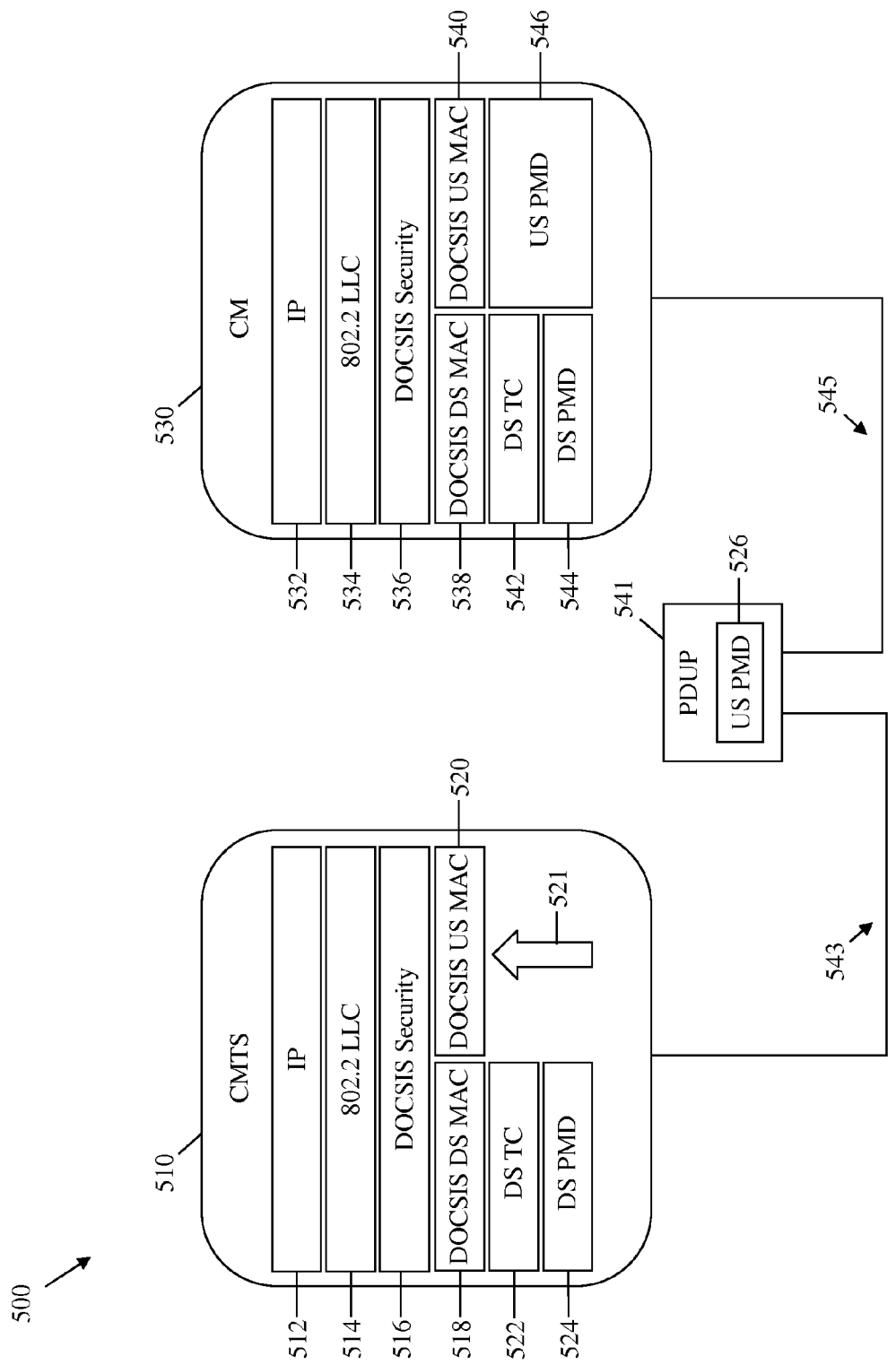
FIG. 5 is a schematic diagram of an embodiment of a modified DOCSIS protocol stack.

FIG. 5 illustrates an embodiment of a modified DOCSIS protocol stack 500, which may be implemented to process the downstream and/or upstream transmitted data and/or services in a NG or modified HFC, such as the HFC 200. Specifically, the DOCSIS protocol stack 500 may be used to support multiple ONs (or ONUs) in the HFC PON, which may be arranged in a P2MP topology, to properly schedule upstream transmissions from the different ONs to the headend. The DOCSIS protocol stack 500 may be arranged to allow each ON (or ONU) to act as a PDUP that may be aware of the DOCSIS protocol stack and process the signals/frames between the CMTS and the CM accordingly or may encapsulate an entire upstream burst including preambles into TDM PON frames from the CM to the CMTS.

The DOCSIS protocol stack 500 may comprise a first stack 510 in the CMTS at the headend and a second stack 530 in the CM at the customer equipment. The first stack 510 and the second stack 530 may communicate via a PDUP 541, e.g. in an ON in the NG HFC. The first stack 510 may be coupled to the PDUP 541 via an optical fiber cable 543 and the second stack 530 may be coupled to the PDUP 541 via a coaxial cable 545. As such, the PDUP 541 may exchange optical upstream signals with the first stack 510 and electrical upstream signals with the second stack 530.

The first stack 510 may comprise a first IP layer 512 at the top for which corresponding frames may be encapsulated by a first IEEE 802.2 LLC layer 514, and subsequently by a first DOCSIS Security layer 516. For downstream transmissions, the frames corresponding to the first DOCSIS Security layer 516 may be encapsulated by a first DOCSIS DS MAC layer 518, followed by a second DS TC layer 522, and transmitted over the optical fiber cable 543 according to a first DS PMD layer 524. For upstream transmissions, the frames corresponding to the first DOCSIS Security layer 516 may be received by a first DOCSIS US MAC layer 520 over the optical fiber cable 543 via a UEPI 521. Similarly, the second stack may comprise a second IP layer 532 at the top for which corresponding frames may be encapsulated by a second IEEE 802.2 LLC layer 534, and subsequently by a second DOCSIS Security layer 536. For downstream transmissions, the frames corresponding to the second DOCSIS Security layer 536 may be encapsulated by a second DOCSIS DS MAC layer 538, followed by a second DS TC layer 542, and transmitted over the coaxial cable 545 according to a second DS PMD layer 544. For upstream transmissions, the frames corresponding to the second DOCSIS Security layer 536 may be encapsulated by a second DOCSIS US MAC layer 540, and received over the coaxial cable 545 according to a second US PMD layer 546. The first layers and second layers may be implemented in a similar manner as in the DOCSIS protocol stack 400 to process the downstream and/or upstream signals between the CMTS and the CM.

However, unlike US PMD 426 in the DOCSIS protocol stack 400, the US PMD layer 546 in the DOCSIS protocol 500 may be implemented by the PDUP 541 instead of the CMTS to receive the upstream traffic over the coaxial cable 545. The US PMD layer 546 may allow the PDUP 541 to receive the frames or packets that comprise data and/or services from the customer equipment and using TDM PON to encapsulate the frames or packets to provide an upstream scheduling mechanism in the P2MP topology of the NG HFC. Thus, the US PMD layer 546 may serve as a proxy layer to process upstream electrical signals from the CM at the PDUP 541, e.g. converting the electrical signals into corresponding upstream optical signals that may be sent in a single channel/fiber to the headend. Thus, the corresponding optical signal may be transmitted over the optical fiber cable 543, received by the UEPI 521, and then processed by implementing the first DOCSIS US MAC layer 520 at the CMTS.

Figure 6:
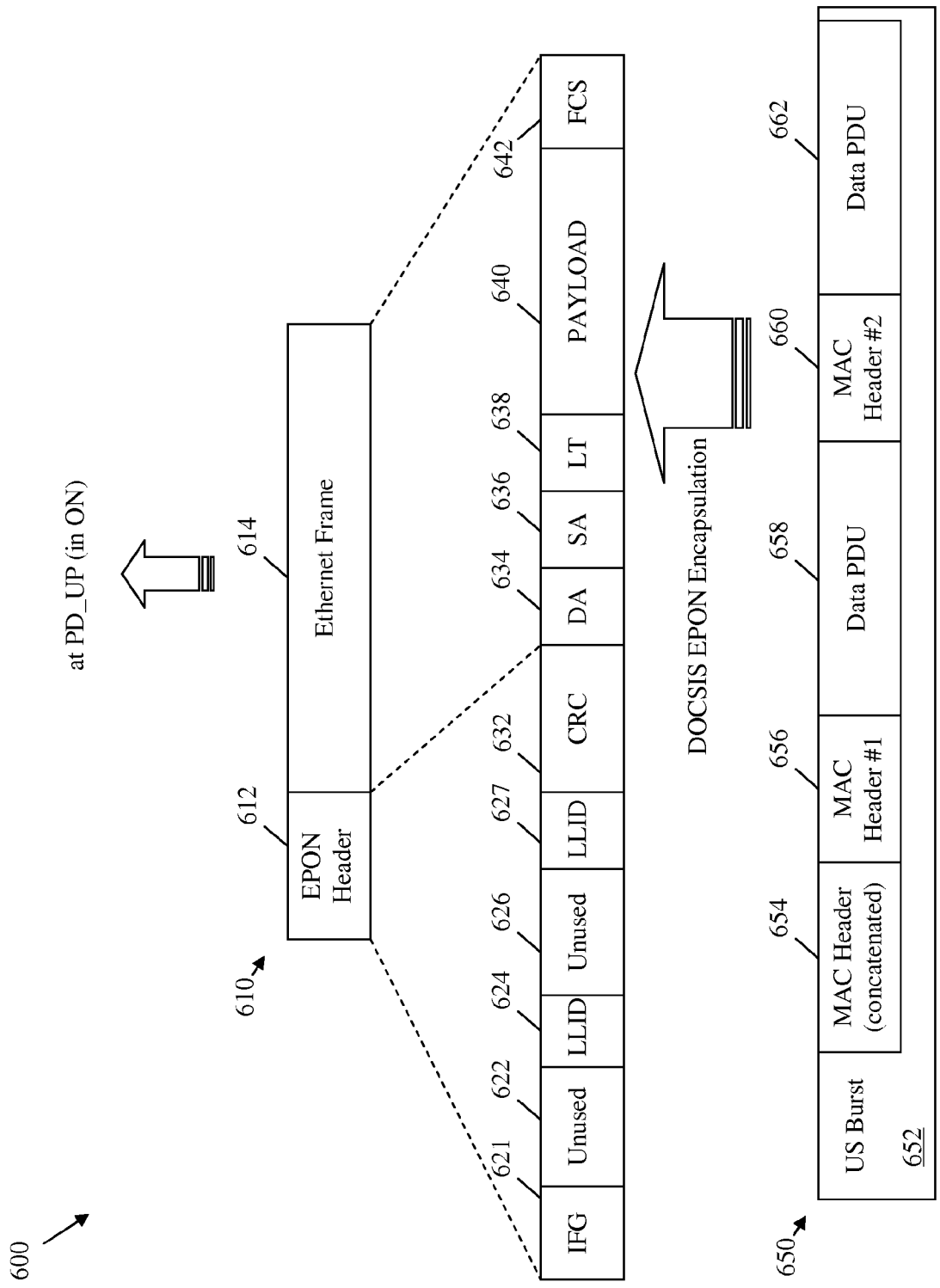
FIG. 6 is a schematic diagram of an embodiment of a framing scheme.

FIG. 6 illustrates an embodiment of a framing scheme 600 that may be used by an ON (e.g. ON 220 or ON 320) that acts as a PDUP to properly schedule upstream transmissions to the headend. For instance, the framing scheme 600 may be implemented in the PDUP 541. At the ON, an upstream burst electrical signal may be received in QAM and/or quaternary phase-shift keying (QPSK) format from the CM via the coaxial plant. The upstream electrical burst signal may comprise data and/or services from different customer equipment.

The ON may encapsulate the upstream burst from CM that including DOCSIS MAC frames and preambles into TDM PON upstream frames. As such, the DOCSIS MAC frame 650 may comprise the US burst preamble 652, a concatenated MAC header 654 that corresponds to a plurality of PDUs from the customer equipment, and a plurality of MAC headers and data PDUs. For instance, the DOCSIS MAC frame 650 may comprise a first MAC header (#1) 656 and a corresponding first data PDU 658, and a second MAC header (#2) 660 and a corresponding second data PDU 662. The first MAC header 656 and the first data PDU 658 may correspond to a first customer equipment and the second MAC header 660 and the second data PDU 662 may correspond to a second customer equipment. As such, the first MAC header 656 and the second MAC header 660 may indicate the first customer equipment and the second customer equipment, respectively. Since the PDUP layer may function as a second type repeater (or 2R regenerator), the ON may not need to include DOCSIS timing information. As such, the data from the CM is encapsulated and forwarded upstream without time synchronization or multiplexing.

The ON may also encapsulate the DOCSIS MAC frame 650 into an EPON frame 610 using an Ethernet protocol. The DOCSIS MAC frame 650 may be embedded into a payload 640 of the EPON frame 610, which may comprise an EPON header 612 and an Ethernet frame portion 614. For example, the EPON header 612 may comprise an Inter-Frame Gap (IFG) 621, a first unused field 622, a first logical link identity (LLID) 624, a second unused field 626, a second LLID 627, and a Cyclical Redundancy Check (CRC) 632. In an embodiment, the first unused field 622 and/or the second unused field 626 may comprise markers to indicate that the payload 640 comprises the DOCSIS MAC frame 650. The IFG 621 may be used to align the frame and the CRC 632 may be used to detect transmission errors. The Ethernet frame portion 614 may comprise a destination address (DA) 634, a source address (SA) 636, a link trace (LT) 638, the payload 640 that comprises the DOCSIS MAC frame 650, and a Frame Check Sequence (FCS) 642. The FCS 642 may also be used to detect transmission errors.

The ON may then convert the electrical signal into an optical signal, and thus send the EPON frame 610 in the upstream wavelength channel to the headend. At the headend, an OLT may receive and covert the optical signal into an electrical signal, and process the EPON frame 610 and may be forwarded DOCSIS MAC frames and preambles to the CMTS (e.g. CMTS 316) via UEPI interfaces.

Figure 7:
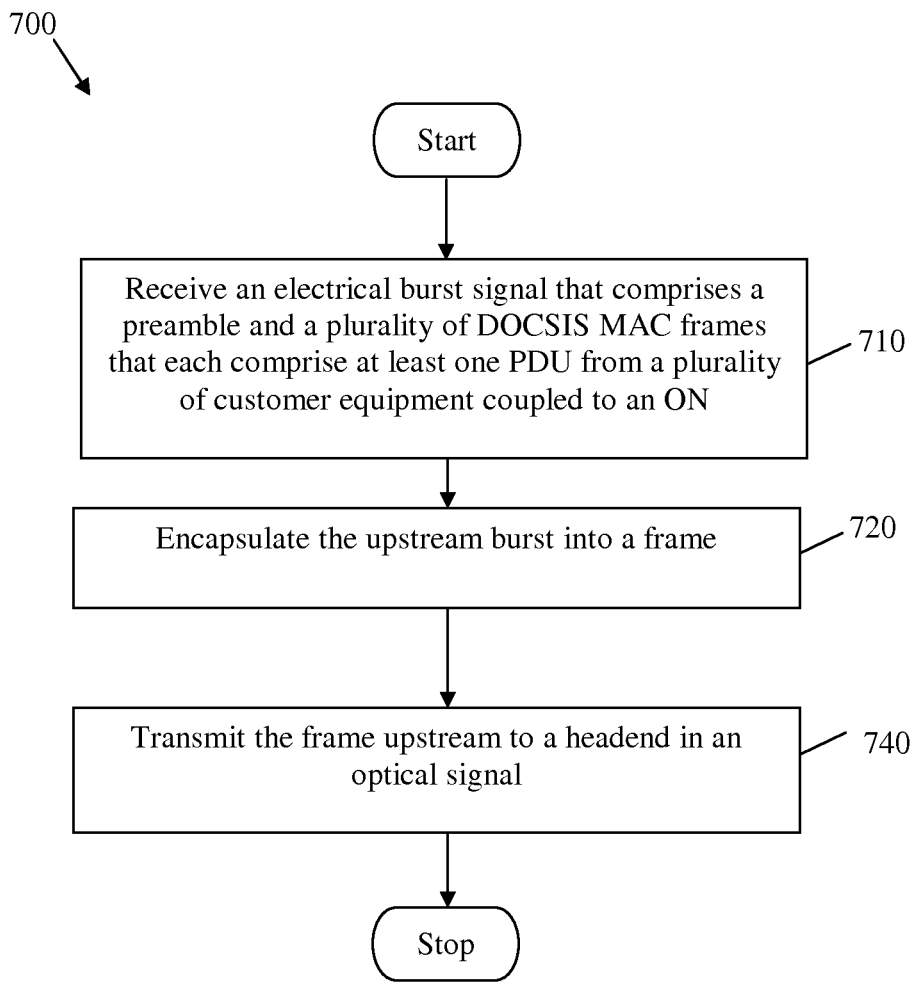
FIG. 7 is a flowchart of an embodiment of an upstream transmission method.

FIG. 7 is a flowchart of one embodiment of an upstream transmission method 700, which may be used to properly schedule upstream transmissions from a plurality of customer equipment in a P2MP PON HFC, e.g. the HFC 200. The upstream transmission method 700 may be implemented by an ON (e.g. the ON 220 or ON 320) that acts as a PDUP, e.g. according to the DOCSIS protocol stack 500. At block 710, the ON may receive an electrical burst signal from a customer equipment coupled to the ON, such as the CMs in the customer equipment 230 or 330. The electrical burst signal may comprise a preamble and a plurality of DOCSIS MAC frame that each comprises at least one PDU. The DOCSIS MAC frame may comprise information that indicates the customer equipment associated with each of the PDUs. At block 720, the electrical burst may be encapsulated into at least one frame using a TDM PON protocol, such as EPON. The frame may comprise information that indicates the ON associated with the customer equipment. At block 740, the frame may be transmitted upstream to a headend in an optical signal that correspond to the received electrical burst signal. For instance, the ONU at the ON may convert the electrical burst signal on an optical carrier. The method 700 may then end.

Figure 8:
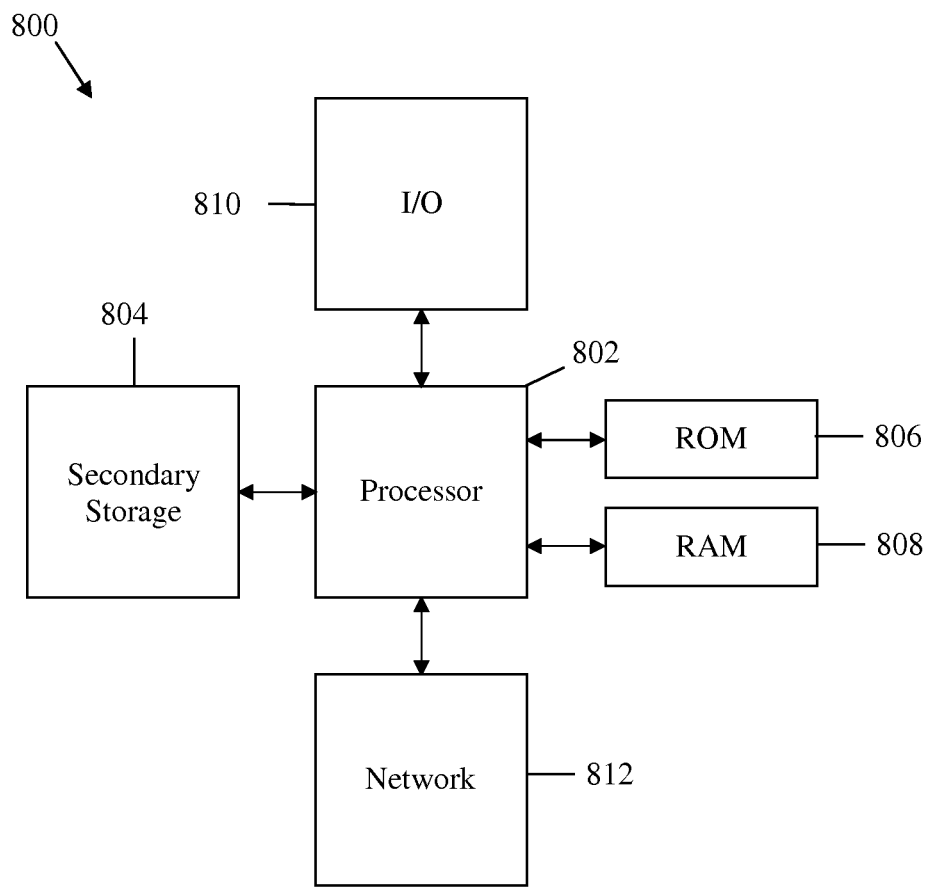
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an overflow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a wavelength-division multiplexer (WDM);
an optical network unit (ONU) coupled to the WDM;
a passive optical network (PON) data over cable service interface specification (DOCSIS) upstream proxy (PDUP) coupled to the ONU and configured to:
couple to a coaxial cable;
encapsulate an upstream burst signal into a payload field of an Ethernet frame using a time-division multiplexing (TDM) PON protocol to provide an upstream (US) scheduling mechanism in a point to multipoint (P2MP) topology of a hybrid fiber-coaxial (HFC) network, wherein the upstream scheduling mechanism does not use DOCSIS timing information, and wherein the Ethernet frame comprises a frame check sequence (FCS) field; and
encapsulate the Ethernet frame into an Ethernet PON (EPON) frame comprising an EPON header field; and
a downstream (DS) optical/electrical (O/E) converter coupled to the WDM and configured to couple to the coaxial cable.

2. The apparatus of claim 1, wherein the WDM is coupled to an optical line terminal (OLT) via a P2MP PON.

3. The apparatus of claim 2, wherein the PON comprises an optical distribution network (ODN) that comprises a PON splitter and that couples the OLT, the ONU, and a plurality of other ONUs in a star configuration, and wherein the OLT, the ONU, and the plurality of other ONUs are at the ends of the ODN.

4. The apparatus of claim 3, wherein the ONU and the plurality of other ONUs are configured to provide services to a plurality of residential and business customers using the PON.

5. The apparatus of claim 1, wherein the DS O/E converter is configured to receive a first downstream wavelength channel from a headend (HE) DOCSIS and Edge Quadrature Amplitude Modulator (EQAM), and wherein the ONU is configured to receive a second downstream wavelength channel from the OLT and to send an upstream wavelength channel to the OLT.

6. The apparatus of claim 5, wherein the first downstream wavelength channel comprises an optical signal at about 1,550 nanometers (nm), the second downstream wavelength channel comprises an optical signal at about 1,490 nm, and the upstream wavelength channel comprises an optical signal at about 1,310 nm.

7. The apparatus of claim 1, wherein the PDUP is configured to implement an upstream (US) Physical Medium Dependent (PMD) layer of a DOCSIS protocol stack to associate a plurality of upstream transmissions from a plurality of customer equipments coupled to the PDUP via the coaxial cable with the ONU and the corresponding customer equipment, and wherein the ONU and the PDUP are configured to schedule the upstream transmissions to a hybrid fiber-coaxial (HFC) headend that is coupled to the ONU via a P2MP optical fiber cable and the WDM so as to avoid collision with other transmissions from other ONUs.

8. The apparatus of claim 1, wherein the ONU supports coaxial plant extension to more than 32 customer premises equipments (CPEs) that include a plurality of cable modems (CMs) and a plurality of set-top boxes (STBs).

9. The apparatus of claim 1, wherein the PDUP is further configured to function as an upstream scheduling proxy between an upstream network element and a downstream network element in the HFC network.

10. The apparatus of claim 4, wherein a cable modem termination system (CMTS) is coupled to the OLT, wherein the ONU is configured to forward the encapsulated upstream burst signals to the OLT, wherein the OLT is configured to de-encapsulate the upstream burst signals, wherein each upstream burst signal comprises US media access control (MAC) layer formatting, and wherein the CMTS is configured to process the US MAC layer formatting.

11. The apparatus of claim 10, wherein the apparatus is configured to enable a plurality of customer premises equipments (CPEs) to communicate with the CMTS via the ODN, and wherein each of the plurality of the CPEs is coupled to the PDUP via the coaxial cable.

12. A method comprising:
 receiving a plurality of upstream burst signals from a plurality of downstream network elements (DNEs) via an electrical distribution network (EDN), wherein the EDN comprises a data over cable service interface specification (DOCSIS) upstream proxy;
 encapsulating each upstream burst signal into a payload field of an Ethernet frame using a time-division multiplexing (TDM) passive optical network (PON) protocol to provide an upstream scheduling mechanism in a point to multipoint (P2MP) topology of a hybrid fiber-coaxial (HFC) network, wherein the upstream scheduling mechanism does not use DOCSIS timing information, and wherein the Ethernet frame comprises a frame check sequence (FCS) field;
 encapsulating the Ethernet frame into an Ethernet PON (EPON) frame comprising an EPON header field; and
 transmitting each frame via a PON to an upstream network element (UNE) coupled to the PON.

13. The method of claim 12, further comprising implementing an upstream (US) Physical Medium Dependent (PMD) layer of a DOCSIS protocol stack to associate each upstream burst signal with the DNE from which the upstream burst signal was received.

14. The method of claim 13, further comprising scheduling transmissions to the UNE by functioning as an upstream scheduling proxy between the the UNE and the DNEs.

15. The method of claim 13, wherein a US media access control (MAC) layer formatting of the DOCSIS protocol stack is processed by the UNE, and wherein each of the DNEs may communicate with the UNE via the PON.

* * * * *

UNITED STATES PATENT AND TRADEMARK OFFICE
CERTIFICATE OF CORRECTION

PATENT NO. : 8,897,651 B2  
APPLICATION NO. : 12/855822  
DATED : November 25, 2014  
INVENTOR(S) : Yuxin Dai Page 1 of 1

It is certified that error appears in the above-identified patent and that said Letters Patent is hereby corrected as shown below:

In the Claims

Column 12 Line 36, Claim 1 should read:

An apparatus comprising:
a wavelength-division multiplexer (WDM);
an optical network unit (ONU) coupled to the WDM;
a passive optical network (PON) data over cable service interface specification (DOCSIS) upstream proxy (PDUP) coupled to the ONU and configured to:
couple to a coaxial cable;
encapsulate an upstream burst signal into a payload field of an Ethernet frame using a time-division multiplexing (TDM) PON protocol to provide an upstream (US) scheduling mechanism in a point to multipoint (P2MP) topology of a hybrid fiber-coaxial (HFC) network, wherein the upstream scheduling mechanism does not use DOCSIS timing information, and wherein the Ethernet frame comprises a frame check sequence (FCS) field;
and
encapsulate the Ethernet frame into an Ethernet PON (EPON) frame comprising an EPON header field; and a downstream (DS) optical/electrical (O/E) converter coupled to the WDM and configured to couple to the coaxial cable.

Column 14 Line 25, Claim 14 should read:

The method of claim 13, further comprising scheduling transmissions to the UNE by functioning as an upstream scheduling proxy between the UNE and the DNEs.

Signed and Sealed this
Nineteenth Day of May, 2015

Michelle K. Lee
*Director of the United States Patent and Trademark Office*